(No Model.)
R. W. RIESS.
STEERING DEVICE FOR VELOCIPEDES.
No. 448,850. Patented Mar. 24, 1891.
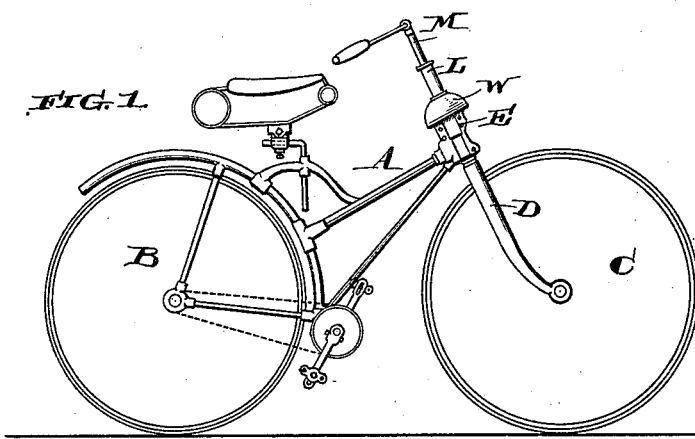
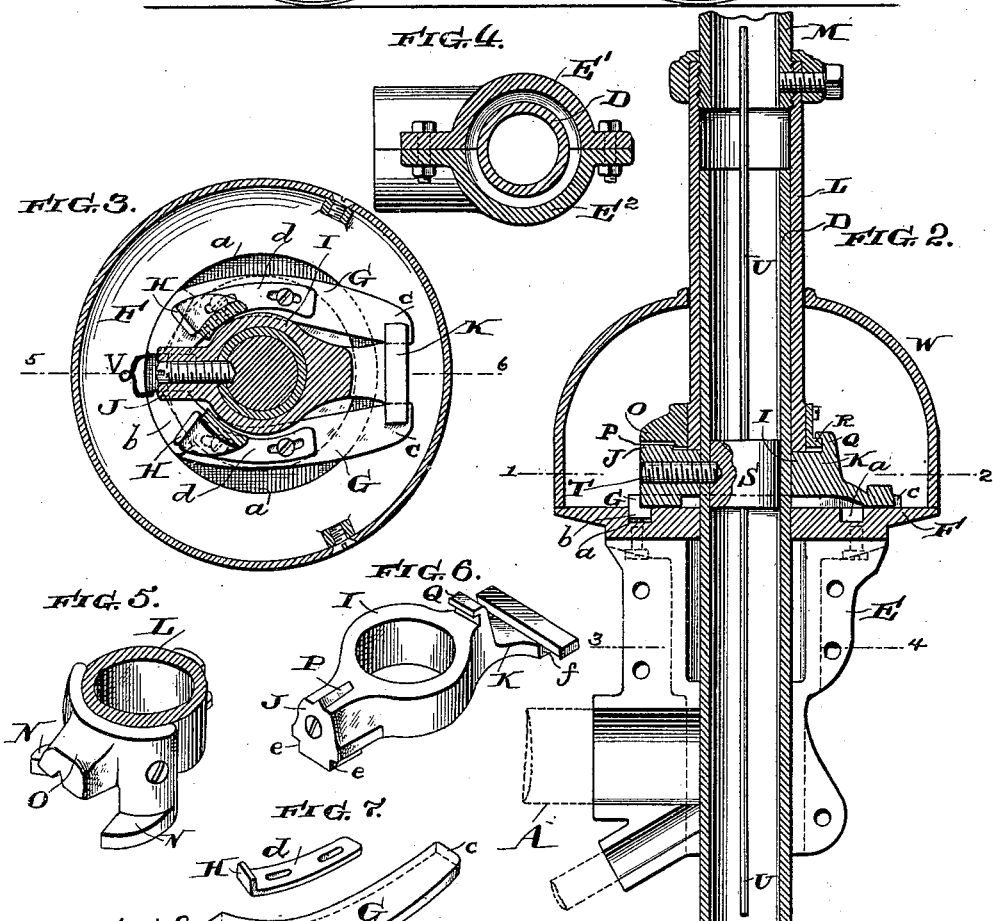
Witnesses:
Inventor:
R. William Riess,
By his attorney,

UNITED STATES PATENT OFFICE.

RUDOLPH WILLIAM RIESS, OF PHILADELPHIA, PENNSYLVANIA.

STEERING DEVICE FOR VELOCIPEDES.

SPECIFICATION forming part of Letters Patent No. 448,850, dated March 24, 1891.

Application filed December 17, 1890. Serial No. 374,976. (No model.)

*To all whom it may concern:*

Be it known that I, RUDOLPH WILLIAM RIESS, of Philadelphia, in the county of Philadelphia and State of Pennsylvania, have invented an Improvement in Steering Devices, of which the following is a specification.

My invention relates to steering devices; and it consists of certain improvements, which are fully set forth in the following specification, and are shown in the accompanying drawings, which form a part thereof.

The object of my invention is to improve the steering appliances of movable vehicles either for land or water conveyance—such as wheeled vehicles or boats—by providing the steering appliances with an automatic lock which shall hold the wheel or rudder fixedly at any desired position or angle to which it has been turned by the steering handle or lever, so that the adjusted wheel or rudder cannot be moved or displaced by any force acting upon it, but may yet be readily turned or moved from above by the steering-handle. The adjusted wheel or rudder is fixedly locked against any force acting below the lock upon the rudder or wheel, and the action of the lock is constant in whatever position the wheel or rudder may be adjusted, while from above the wheel or rudder is not locked and may be easily operated through the steering handle or lever.

In the drawings and in the description thereof I have shown my invention applied to a bicycle, to which it is particularly adapted; but it will be readily perceived that the apparatus may be also applied to other vehicles, the change involving merely a double use of the invention.

In bicycles great difficulty is experienced from the freedom of the front or steering wheel to turn from any force applied to it or to the wheel-fork below the steering-head. The striking of an obstruction tends to turn the wheel and usually causes upsetting of the vehicle. By the locking of the wheel-fork against any force acting from below the steering-head such an accident is prevented. Instead of turning upon striking an obstruction, the wheel will ride over it without any change in its position, and this effect takes place not only when the bicycle is traveling in a straight course, but also when the wheel is turned at an angle in rounding curves, &c., since the wheel-fork is locked from below the steering-head in all positions in which it may be turned.

The device is also of particular advantage when the machine is used for "coasting" or in fancy riding, since the wheel cannot turn from its adjusted position without a positive operation of the handle-bars.

In the drawings, Figure 1 is a side elevation of a bicycle having my improved steering appliances applied thereto. Fig. 2 is a vertical sectional view of the steering-head of the same, on an enlarged scale, taken on the line 5 6 of Fig. 3. Fig. 3 is a sectional plan view of the same on the line 1 2 of Fig. 2. Fig. 4 is a cross-sectional view of the same on the line 3 4 of Fig. 2. Fig. 5 is a perspective view of a portion of the steering handle or key. Fig. 6 is a perspective view of a portion of the lock detached from the other parts, and Fig. 7 is a perspective view of one of the movable locking-pieces.

A is the main frame of the bicycle.

B is the rear wheel carried thereby, and C is the front or steering wheel carried by the wheel-fork D. The wheel-fork projects up through the steering-head E, with which the main frame A is connected in the usual manner.

Upon the upper face of the steering-head E is a disk F, provided with an annular groove $a$. The wheel-fork, or the tubular continuation thereof, extends up through this disk F, as is shown in Fig. 2. The disk F may be made a part of the steering-head E; but for the purpose of fitting my improved steering apparatus upon the bicycles as at present constructed the part E may be made of two castings $E'$ $E^2$, Fig. 4, bolted or riveted together over the ordinary steering-head, with the disk F attached to them.

G G are two movable locking-pieces supported upon the disk F upon opposite sides of the wheel-fork D, and are provided with lugs $b$ upon their lower faces, which extend into the grooves $a$, and are guided therein when the locking-pieces G are moved. The rear ends $c$ of the pieces G extend rearwardly beyond the groove $a$, and the locking-pieces are preferably slightly curved, as shown in Figs. 3 and 8.

Carried by each locking-piece G, adjacent to the forward ends, on the under side of which the lugs $b$ are located, are projections H. These projections H are preferably adjustable, and may be formed for this purpose upon a slotted plate $d$, connected with the upper face of the piece G by means of screws.

I is a collar fastened to the extension of the wheel-fork D immediately above the disk F, having a forward projection J, which fits between the forward or front ends of the movable pieces G, and a rearward projection K, which fits between the rear ends $c$ of the movable pieces. Both the forward and rear projections J and K are preferably formed with shoulders $e$ and $f$, respectively, under which the ends of the movable pieces G fit.

L is a tubular handle or key with which the handle-bar M is connected. This tubular handle or key L fits over the extension of the wheel-fork D and is movable thereon.

The handle or key L is turned by the handle-bar M. Carried by the handle or key L are two lugs or projections N, one on each side of the forward projection J of the collar I and immediately adjacent to the projections H of the movable locking-pieces G.

For the purpose of properly centering the handle or key L with reference to the collar I, it is provided with a grooved projection O, adapted for engagement with a lug P upon the collar I.

Q is a hooked projection carried by the collar I, adapted to engage a lug R, carried by the handle or key L, to lock the two together against vertical movement.

As considerable strain is exerted upon the collar I during the operation of the apparatus, it is necessary that it should be firmly secured to the extension of the wheel-fork D. To accomplish this, I prefer to form the tubular wheel-fork with an opening or hole at the point where the attachment is to be made and to place within the tube a circular block S, which receives the screw T through the hole in the tube. By this means firm support is given to the tube D through its circumference at the point of contact, and the strain of the screw T is taken by the solid block or cube S.

U is a wire connected with the block or cube S for inserting it in position within the tube D and to enable it to be removed therefrom, if desired. I prefer to have this wire extend down below the block or cube S, as shown in Fig. 2, with the end resting upon the end of the tube to assist in adjusting the block or cube in position. The block or cube S is located in such a position upon the wire U that it will be in exact position with reference to the point of attachment of the collar I when the end of the wire touches the bottom of the hollow tube. W is a cap or cover carried by the disk F to conceal it from view and to protect the operative parts of the apparatus.

V is a spring arranged between the ends of the movable locking-pieces G G to hold them in position with their ends $c\ c$ against the projection K.

From the foregoing description of the construction the operation of the apparatus will be readily understood.

Upon any attempt to turn the wheel C or the wheel-fork D, the tendency of the collar I is to turn also, since the collar I is connected with the extension of the wheel-fork and must move with it. The projection K of the collar I acts upon the ends of the movable pieces G G and exerts its force out of line with the annular groove $a$. The effect of this is to cause the lugs $b\ b$ of the movable pieces G G to jam in the groove $a$, and this absolutely prevents the movement of the wheel-fork D by locking the end K of the collar I. In practice I find it expedient to form the lugs $b\ b$ with slight lateral play to insure a jamming or locking of them in the groove $a$, since the force applied to the ends of the pieces G G, being out of the line of the groove $a$, tends to throw the lugs $b\ b$ across the groove. By turning the handle-bar M, however, the tendency is to turn the key L upon the extension of the wheel-fork D, and force is applied through the lugs N N of the key L upon the projections H H of the movable pieces G G. This force, being applied directly upon the movable pieces G G adjacent to the lugs $b\ b$ and acting directly in the line of the groove $a$, readily turns the pieces G G, the lugs moving in the groove, and through the action of the pieces G G upon the projections J and K the collar I is moved, turning with it the wheel-fork D and the steering-wheel C. The force is applied through the key L upon one of the pieces G, which is forced against the projection J, and thus forces the projection J against the other movable piece G, turning it also.

It will be seen that the wheel C and wheel-fork D are locked constantly from below by the movable pieces G G in every position in which they are turned. The wheel-fork D is a rotatable rod carrying the part to be steered or turned, and the apparatus may be readily adapted to a boat by substituting simply a rudder for the wheel C and connecting the tiller-ropes with the handle-bar M.

The mere details of construction which have been here shown, while preferred, are not necessary limitations of the invention, and may be varied, if desired.

Having now described my invention, what I claim as new, and desire to secure by Letters Patent, is—

1. In a steering apparatus, the combination of a movable rod, a steering part carried thereby, a lock to prevent the movement of said rod, and a key connected with the steering-handle to unlock said lock when turned and rotate the rod.

2. In a steering apparatus, the combination of a movable rod, a steering part carried thereby and movable therewith, a movable locking-piece normally acting as an obstruction to the movement of said rod, and a key connected with the steering-handle to move said locking-piece and rod.

3. In a steering apparatus, the combination of a movable rod having a projecting portion, a steering part carried by said rod and movable therewith, a locking-piece arranged in the path of said projecting portion of the rod to normally lock the rod against movement, and a key connected with the steering-handle to move said lock against the projecting portion and turn the rod.

4. The combination, in a steering apparatus, of a movable rod provided with a projecting portion, a steering part connected with said rod and moved by it, a grooved plate adjacent to said rod, a locking-piece in said groove in the path of said projecting portion, said projecting portion acting against said locking-piece out of line with the groove and tending to jam the locking-piece therein, and a key acting upon the locking-piece in line with said groove to move it therein against the projecting portion of the rod to turn said rod.

5. In a steering apparatus, the combination of a steering-head provided with a disk having an annular groove, a rotatable rod extending through said steering-head and projecting beyond said disk, a movable locking-piece having a lug guided in said groove, a projecting part carried by said rod and arranged adjacent to said locking-piece out of line with said annular groove, and a key acting upon said movable locking-piece in line with said groove to turn it and rotate the rod.

6. In a steering apparatus, the combination of a rotatable rod, a steering part carried thereby and movable therewith, the disk F, through which said rod projects, provided with an annular groove $a$, the movable locking-pieces G G, provided with lugs $b\ b$, guided in said groove $a$, and with the projections H H, a projecting part carried by said rod and acting upon said movable pieces G G out of line with the groove $a$, and a key L, connected with the steering-handle and having lugs N N acting upon the projections H H in line with the groove $a$ to turn the pieces G G and the movable rod.

7. In a steering apparatus, the combination of a rotatable rod, a steering part carried thereby and movable therewith, the disk F, through which said rotatable rod projects, provided with an annular groove $a$, the curved locking-pieces G G, arranged one on each side of the rotatable rod, the collar I, carried by the rotatable rod and having the projections J and K, arranged, respectively, between the forward and rear ends of said pieces G G and acting against them out of line with said groove $a$, and a key L, connected with the steering-handle and acting upon said pieces G G in line with the groove $a$ to move said pieces and cause the rod to rotate.

8. In a bicycle, the combination of the wheel-fork, a steering-head through which said wheel-fork extends, a lock carried by said steering-head and normally locking said wheel-fork against rotation in every position in which it is turned, and a key connected with the handle-bar to unlock said lock and rotate the wheel-fork.

9. In a bicycle, the combination of a steering-head, a wheel-fork movable therein, a handle-bar unconnected with said wheel-fork, a lock to normally lock said wheel-fork to the steering-head in all positions, and a key carried by said handle-bar to unlock said wheel-fork and rotate it.

10. In a bicycle, the combination of a steering-head, a wheel-fork having a tubular extension extending through said steering-head, a collar I, having a projection, a locking-piece arranged in the path of said projection to lock the wheel-fork against rotation, a block S within the wheel-fork, and a screw or pin T, connecting said collar I and block S through the tubular extension of the wheel-fork, substantially as and for the purpose specified.

11. In a bicycle, the combination of a steering-head, a wheel-fork having a tubular extension extending through said steering-head, a collar I, having a projection, a locking-piece arranged in the path of said projection to lock the wheel-fork against rotation, a block S within the wheel-fork, and a screw or pin T, connecting said collar I and block S through the tubular extension of the wheel-fork and the adjusting-wire U, substantially as and for the purpose specified.

In testimony of which invention I have hereunto set my hand.

R. WILLIAM RIESS.

Witnesses:
R. M. HUNTER,
ERNEST HOWARD HUNTER.